United States Patent [19]

Sauber

[11] Patent Number: 4,768,745
[45] Date of Patent: Sep. 6, 1988

[54] RESILIENT BUMPER ASSEMBLY

[76] Inventor: Charles J. Sauber, 10 N. Sauber Rd., Virgil, Ill. 60182

[21] Appl. No.: 60,532

[22] Filed: Jun. 11, 1987

[51] Int. Cl.⁴ .................................. A47B 95/00
[52] U.S. Cl. ........................ 248/345.1; 224/323; 248/75; 248/201
[58] Field of Search .............. 224/323, 326, 327; 248/345.1, 76, 78, 75, 201, 251

[56] References Cited

U.S. PATENT DOCUMENTS

| | | | |
|---|---|---|---|
| 3,856,194 | 12/1974 | Helm | 248/345.1 X |
| 3,877,624 | 4/1975 | Carson | 224/323 |
| 4,015,760 | 4/1977 | Bott | 224/326 X |
| 4,372,470 | 2/1983 | Dallaire | 224/323 X |
| 4,473,178 | 9/1984 | Bott | 224/327 X |

Primary Examiner—Ramon O. Ramirez
Attorney, Agent, or Firm—Leydig, Voit & Mayer

[57] ABSTRACT

A resilient bumper assembly for use on such as for example on a ladder carrier or encapsulated cushion for cylinder shaped objects features a base member with an elongated trough formed therein and outriggers disposed at opposite ends of the trough. Each of the outriggers includes a horizontal arm, projecting toward the other outrigger. A hollow tubular resilient member which may be a length of a hose is inserted between the outriggers and held within the trough so that the arms project into opposite ends of the resilient member and retain it against transverse and lateral movement.

The assembly is simple, convenient and economical to manufacture and use and can be adapted for use in a variety of applications requiring a bumper arrangement.

18 Claims, 2 Drawing Sheets

RESILIENT BUMPER ASSEMBLY

FIELD OF THE INVENTION

The present invention relates generally to resilient bumper devices, and particularly to an improved resilient bumper arrangement which allows a simple initial assembly as well as replacement of the bumper without special and costly components.

BACKGROUND OF THE INVENTION

There are many applications, such as with vehicles used for transporting a load, where carriers or moldings are mounted on a roof top or on the side to support the load, that require resilient bumpers for protecting the load and vehicle or supporting structure. Typically, the resilient bumper, as well as the base holding it in place, are non-standard designs made up with special tooling. Replacement of a worn or damaged bumper can be costly and inconvenient to locate. There is a clear need for a resilient bumper assembly that will not only support and protect a load and/or vehicle when either the vehicle is moving or the load is being mounted or removed from the vehicle, but will also allow the bumper to be replaced when needed in a low cost, simple and readily available manner.

SUMMARY OF THE INVENTION

It is a primary object of the present invention to provide a resilient bumper assembly of a simple, convenient and reliable construction, which is economical to manufacture and use.

The above object is realized, according to this invention, by providing a base member of unitary form available to adapt to substantially any curvature of a carrier body. The base member preferably has an elongated cylindrical trough formed therein with outriggers disposed at each of its ends. Each of the outriggers has a generally horizontal arm projecting inwardly toward the other, which is positioned parallel to and above the base member. The opposite ends of a hollow tubular resilient member insertably receive the arms so as to securely bridge the resilient member between the outriggers. The resilient member and the arms of the outriggers are designed to mate with each other so as to hold the member in the trough and yet to potentially allow the member to be rotated about the axis of the arms when an object or a load is slid transversely across the member.

It is another object of the present invention to provide a resilient bumper assembly which is easily assembled and firmly held together, thereby preventing dislodging of the resilient member in the longitudinal and transverse directions.

It is yet another object of the present invention to provide low cost, easy and convenient replacement of the resilient member in the event of its damage or wearing out in use.

Other objects and advantages of the present invention will become apparent upon reading the attached detailed description and upon reference to the drawings.

Figure 1:
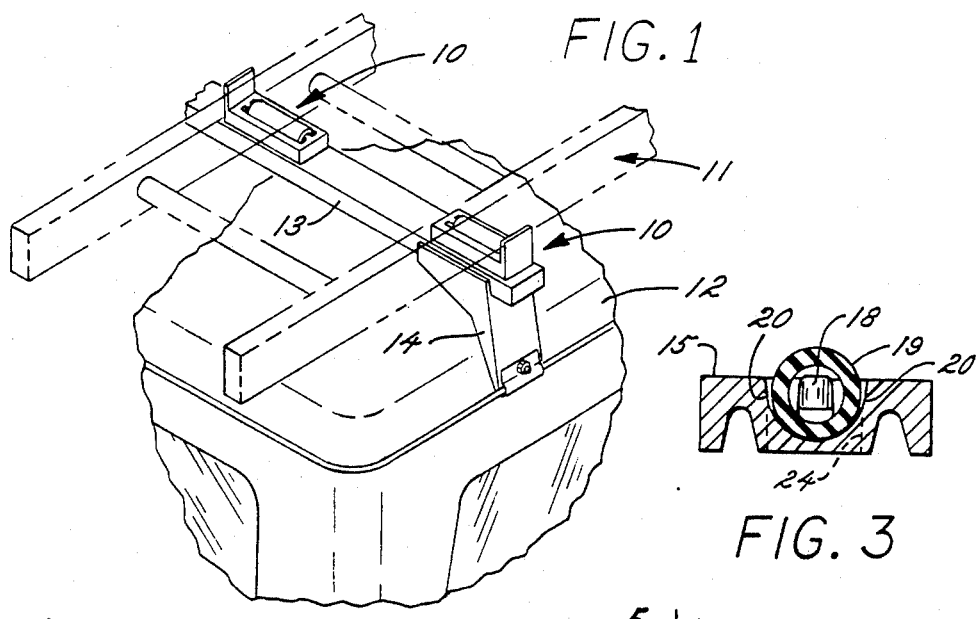
FIG. 1 is a perspective, partial cutaway view of a carrier body showing a horizontal type of resilient bumper assembly for supporting an object, here being a ladder shown in phantom, according to one embodiment of the present invention.
Figure 3:
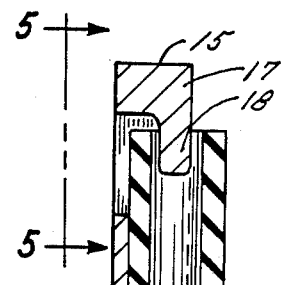
FIG. 3 is a sectional view of the resilient bumper taken substantially along the line 3—3 in FIG. 2, and in FIG. 6.

While the invention is susceptible to various alternative forms and modifications, specific embodiments thereof have been shown by way of example in the drawings and will herein be described in detail. It should be clear, however, that it is not intended to limit the invention to the particular forms disclosed, but on the contrary, the intention is to cover all modifications, equivalents, and alternatives falling within the scope and spirit of the invention as described in detail herein.

DESCRIPTION OF THE PREFERRED EMBODIMENT

Referring to the drawings, in particular, FIG. 1 illustrates a specific exemplary embodiment of the invention when used in connection with a ladder carrier generally indicated at 10, the ladder 11 (in phantom) being supported on top of a vehicle roof 12. However, as will be seen from the following description, the bumper assembly of the present invention may be applied to a much more general category of applications.

Figure 4:
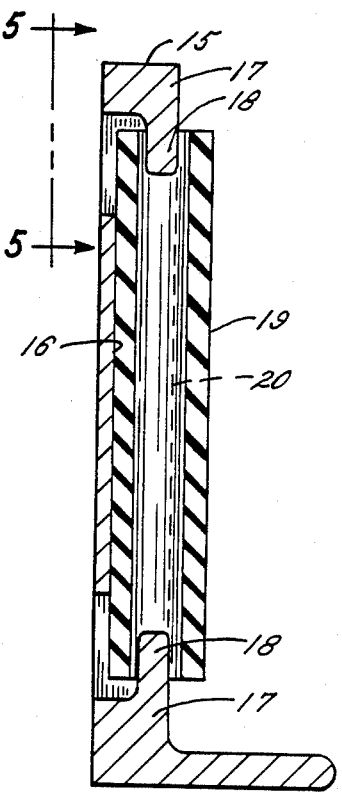
FIG. 4, is a sectional view of the resilient bumper assembly taken substantially along the line 4—4 in FIG. 2.
Figure 2:
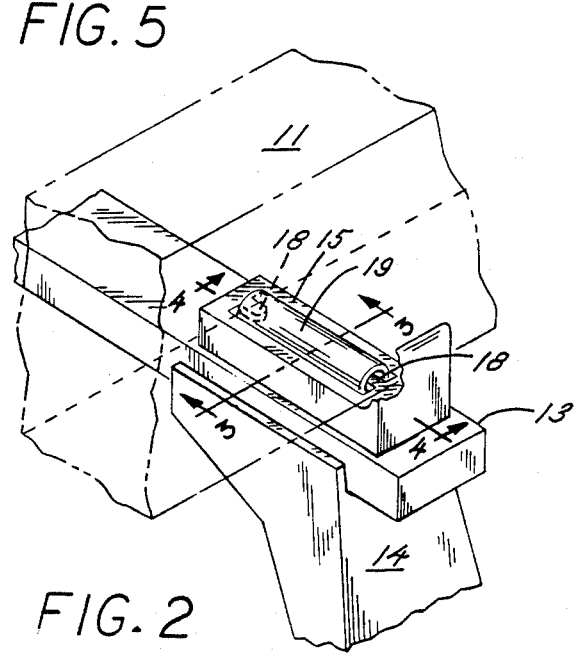
FIG. 2 is an enlarged fragmental perspective view of the resilient bumper assembly as illustrated in FIG. 1.

In the illustrative embodiment in FIG. 1, the ladder carrier employs two spaced resilient bumper assemblies 10, according to the present invention, which are aligned on opposite ends of a support member 13 mounted on a roof of a vehicle with mounting brackets 14. Referring to FIG. 2, there is shown an enlarged fragmental perspective view of the resilient bumper assembly 10 of FIG. 1 comprising a base member 15, which can be unitarily cast, having an elongated trough 16 formed therein. Outriggers 17, as shown in FIG. 4, having generally horizontal arms 18, are projecting inwardly toward each other, and are disposed at opposite ends of the trough 16. The arms 18 are parallel to and spaced above the plane of the bottom of the trough of the base member 15 so that the arms can project into the ends of a hollow tubular resilient member 19 to restrain the member against transverse and lateral movement.

Figure 9:
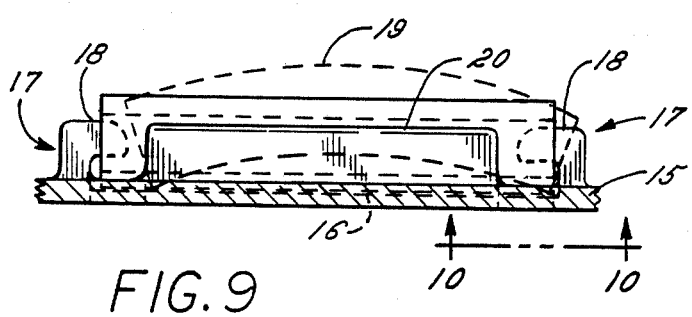
FIG. 9 is a side elevational view of FIG. 7 depicting the installation and removal of a hollow tubular resilient member.

In accordance with the present invention, the resilient member 19 can be made from a cut length of conventional hose or tubing which is preferably a rubbery material. In practicing the invention, the resilient member or hose 19 can be easily installed, as shown in FIG. 9, by first placing one end of the hose 19 over one of the arms 18 and then deforming the hose 19 in order to slide it onto the corresponding arm. The arms 18 are designed such that they are spaced above the plane of the bottom of the trough of the base member 15 by a distance substantially equal to the radius of the hose 19.

Figure 8:
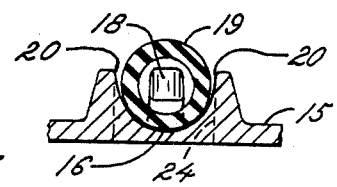
FIG. 8 is a cross-sectional view of the resilient bumper assembly taken along section line 8—8 in FIG. 7.

In accordance with the present invention and as illustrated in FIG. 8, the elongated cylindrical trough 16, of width comparable to the outer diameter of the hose, and the outriggers provide means for allowing the hose to be potentially rotated when a load is slid transversely across the resilient member. Thus, the outer portion of the hose adapted to receive impact forces provides the potential for turning as a way to prevent wearing out or damage to the bumper. This, represents another economically effective feature of the invention.

Figure 7:
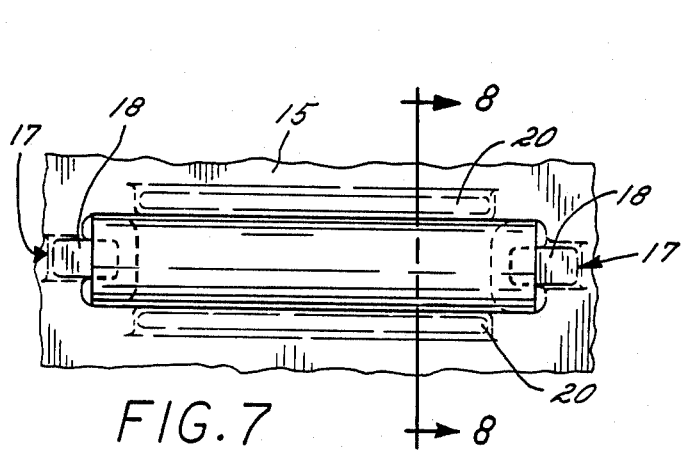
FIG. 7 is a top plan view of the resilient bumper assembly according to another embodiment of the present invention.

In accordance with another aspect of the present invention, additional security for the hose is gained by a set of spaced apart shoulders 20, as shown in FIG. 7, positioned generally parallel to the axis of the hose 19 along the length of the trough 16, thereby preventing dislodging of the hose 19.

This feature also significantly enhances the integrity of the hose assembly in that removal of the hose 19 is restricted to initiation from the ends of the hose. It may be desirable to provide shoulders 20 with effective height so that there will be no damaging contact between shoulders and a load.

In accordance with the present invention, means are provided for a low cost easy and convenient replacement of the hose 19 in the event of its damage or wearing out in use. Since such hose 19 is commonly available and often even carried in vehicle tool chests, it is a relatively simple task to cut off a desired length for replacement of a worn or damaged bumper.

Figure 6:
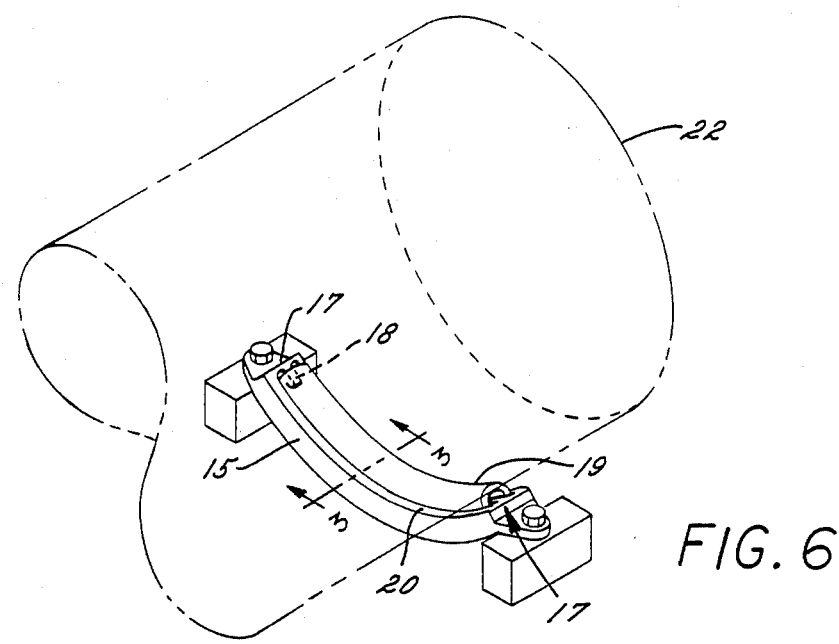
FIG. 6 is a fragmentary perspective view showing an alternative curved type of the resilient bumper assembly for protecting a generally cylindrical body according to another embodiment of the present invention.

In another embodiment, depicted in Fig. 6, the resilient bumper assembly is used as an encapsulated cushion for a load of generally cylindrical objects 22 (shown in phantom) ,such as pipes and rods. This is accomplished through adaptation of the base member 15 having the form of an unitary cast bracket so as to follow the curvature of the cylindrical load. As in the previous embodiment, the resilient member 19 is inserted between outriggers 17 and held within an elongated cylindrical trough 16 formed in the base member 15. Outriggers 17 include a generally horizontal arms 18 projecting inwardly toward the other. These arms 18 are parallel to and above the plane of the bottom of the base member 15 and project into opposite ends of the resilient member 19 to provide restraint against transverse and lateral movement. It is preferred to provide base member 15 with such effective length as to hold a generally cylindrical object in place as well as to enable use of the resilient bumper assembly of this invention.

Figure 5:
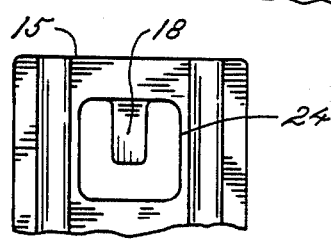
FIG. 5 is a bottom fragmentry view taken along the line 5—5 in FIG. 4.
Figure 10:
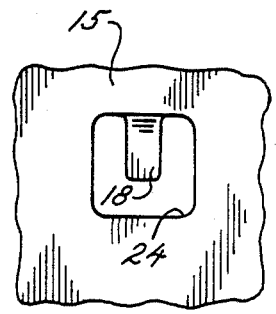
FIG. 10 is a fragmentary bottom view taken along the line 10—10 in FIG. 9.

Since it is preferable that the base and outriggers are a unitary casting, as shown in FIGS. 5 and 10, the base member 15 includes an opening 24 which permits use of a top and bottom two part die for forming the unit structure without coring or movable die type tooling.

As can be seen from the foregoing detailed description, the resilient bumper assembly is extremely simple and economical to manufacture and use, and can be adapted in a variety of applications requiring bumper protection.

It should be apparent to those skilled in the art that changes may be made in the shapes, dimensions, and arrangements of the parts of the invention without departing from the principle thereof, the above setting forth only preferred forms the invention.

I claim as my invention:

1. A resilient bumper assembly, comprising in combination:
   (a) a base member having a top and bottom, an elongated trough formed in the top, shoulder means on said base member disposed adjacent opposite sides of said trough,
   (b) outriggers disposed at opposite ends of said trough, each of said outriggers including a generally horizontal arm projecting inwardly toward the other outrigger between said shoulders and within the plane of the top of said base member, said arms being parallel to and spaced above the plane of the bottom of said trough of said base member, and
   (c) a resilient member having at least hollow ends adapted to be inserted between said outriggers and held partially within the top plane of said trough so that said arms project into opposite ends of said resilient member and restrain said member against transverse and lateral movement.

2. The resilient bumper assembly of claim 1 wherein said hollow ended resilient member is a length of tubular hose made of a rubbery material.

3. The resilient bumper assembly of claim 1 wherein said arms are spaced above the plane of the bottom of said trough of said base member by a distance substantially equal to the radius of said hollow ended resilient member.

4. The resilient bumper assembly of claim 1 wherein said base member includes at least one shoulder positioned along the length on at least one side of said trough.

5. The resilient bumper assembly of claim 4 wherein said shoulder is positioned generally parallel to the axis of said resilient member for retaining said resilient member against transverse movement.

6. The resilient bumper assembly of claim 1 wherein said base member and outriggers are unitarily cast.

7. the resilient bumper assembly of claim 1 wherein said trough has width comparable to the outer diameter of said hollow ended resilient member.

8. The resilient bumper system of claim 1 wherein said base member and trough are arcuately shaped.

9. A resilient bumper assembly, comprising in combination:
   (a) a base member having an upper surface,
   (b) means defining an elongated trough on said upper surface of said base member,
   (c) outriggers disposed at opposite ends of said trough, each of said outriggers including a generally horizontal arm projecting inwardly toward the other outrigger between said trough defining means, said arms being parallel to and spaced above the upper surface of said base member, and
   (d) a hollow resilient member adapted to be inserted between said outriggers and held partially within said trough so that said arms project into opposite ends of said resilient member and restrain said member against transverse and lateral movement.

10. The resilient bumper assembly of claim 9 wherein said hollow resilient member is a length of hose made of a rubbery material.

11. The resilient bumper assembly of claim 9 wherein said arms are spaced above the surface of the trough by a distance substantially equal to the radius of said hollow resilient member.

12. The resilient bumper assembly of claim 9 wherein said base member includes a set of spaced apart shoulders positioned along the length of said trough.

13. The resilient bumper assembly of claim 12 wherein said shoulders are positioned generally parallel to the axis of said resilient member.

14. The resilient bumper assembly of claim 9 wherein said base member and outriggers are unitarily cast.

15. The resilient bumper assembly of claim 9 wherein said trough has width comparable to the outer diameter of said hollow resilient member.

16. The resilient bumper assembly of claim 9 wherein said base member and trough are arcuately shaped.

17. A resilient bumper assembly, comprising in combination:
   (a) a base member having an elongated trough formed therein,
   (b) outriggers disposed at opposite ends of said trough, each of said outriggers including a generally horizontal arm projecting inwardly toward the other outrigger, said arms being parallel to and spaced above the plane of the bottom of said trough of said base member, and
   (c) a resilient member having at least hollow ends adapted to be inserted between said outriggers and held within said trough so that said arms project into opposite ends of said resilient member and restrain said member against transverse and lateral movement, wherein said outriggers and said trough provide means for allowing said resilient member to be potentially rotated when a load is slid transversely across said resilient member.

18. A resilient bumper assembly, comprising in combination:
   (a) a base member having an upper surface,
   (b) means defining an elongated trough on said upper surface of said base member,
   (c) outriggers disposed at opposite ends of said trough, each of said outriggers including a generally horizontal arm projecting inwardly toward the other outrigger, said arms being parallel to and spaced above the surface of said base member trough, and
   (d) a hollow resilient member adapted to be inserted between said outriggers and held within said trough so that said arms project into opposite ends of said resilient member and restrain said member against transverse and lateral movement, wherein said outriggers and said trough provide means for allowing said resilient member to be potentially rotated when a load is slid transversley across said resilient member.

* * * * *